March 21, 1950 J. LOLLI ET AL 2,501,472

AUTOMATIC STATION SELECTING AND TUNING DEVICE FOR RADIO RECEIVERS AND THE LIKE

Filed April 17, 1946 7 Sheets-Sheet 1

Inventors.
John Lolli
Gene Papitto
By: Robert H. Wendt Atty.

March 21, 1950 J. LOLLI ET AL 2,501,472

AUTOMATIC STATION SELECTING AND TUNING DEVICE FOR RADIO RECEIVERS AND THE LIKE

Filed April 17, 1946 7 Sheets-Sheet 2

Inventors.
John Lolli
Gene Papitto
By: Robert H. Wendt
Atty.

Inventors.
John Lolli
Gene Papitto
By Robert H. Wendt
Atty.

Inventors
John Lolli
Gene Papitto
By: Robert H. Wendt
Atty.

March 21, 1950

J. LOLLI ET AL 2,501,472

AUTOMATIC STATION SELECTING AND TUNING DEVICE FOR RADIO RECEIVERS AND THE LIKE

Filed April 17, 1946

7 Sheets-Sheet 5

Inventors.
John Lolli
Gene Papitto
By: Robert H. Wendt
Atty.

March 21, 1950 J. LOLLI ET AL 2,501,472

AUTOMATIC STATION SELECTING AND TUNING DEVICE FOR RADIO RECEIVERS AND THE LIKE

Filed April 17, 1946 7 Sheets-Sheet 6

Inventors
John Lolli
Gene Papitto
By: Robert H. Wendt
Atty.

Inventors.
John Lolli
Gene Papitto
By: Robert H. Wendt
Atty.

Patented Mar. 21, 1950

2,501,472

UNITED STATES PATENT OFFICE 2,501,472

AUTOMATIC STATION SELECTING AND TUNING DEVICE FOR RADIO RECEIVERS AND THE LIKE

John Lolli and Gene Papitto, Chicago Heights, Ill.

Application April 17, 1946, Serial No. 662,670

4 Claims. (Cl. 250—20)

The present invention relates to automatic station selecting and tuning devices for radio receivers, and is particularly concerned with the provision of an improved station selector for home radio receivers, which is adapted to energize suitable circuits at predetermined times so that a home radio receiver may be automatically tuned at pre-selected times to receive broadcasts from such stations as are desired, the selected stations following one after another without interruption and without any necessary attention on the part of the user.

While the present devices are peculiarly adapted for selecting and tuning home radio receivers to desired stations, we wish it to be understood that the present mechanism may be utilized for various different purposes, and parts of the mechanism are of general application and may be employed in many different arts.

One of the objects of the invention is the provision of an improved station selector for home radio receivers by means of which the user may, while a station is broadcasting, or at any earlier time, so adjust the elements of the device that the radio receiver will be automatically tuned to the station or stations desired practically instantaneously at the time the adjustment is made or at some future selected time and so that the user may thereafter be provided with broadcast reception for every fifteen minute period of the day and night as he desires, without interruption.

Another object of the invention is the provision of an improved mechanism of the class described which permits the user to utilize manual tuning as and when desired, and which also permits the user to utilize push button tuning at any time he may so desire.

Another object of the invention is the provision of an improved mechanism of the class described including step-by-step means for moving the mechanism from its proper position for one fifteen minute period of time to the proper position for the next fifteen minute period of time, which mechanism positively holds the elements in the proper predetermined position, and which permits the change to be made practically instantaneously and exactly at the end of each fifteen minute period, with an accuracy within a few seconds.

Broadcasts are frequently prefaced by means of commercial broadcasts, which may also occupy a portion of the period near the end of the fifteen minute period, and thus a few seconds' variation in the time during which the mechanism switches from one station to another is not of the utmost importance; but it is important that the timing be as accurate as possible; as the commercial broadcast part may be very short, and no automatic station selector and tuning device which does not operate at substantially the exact beginning or end of a program would be satisfactory to the public.

Another object of the invention is the provision of an improved selector and tuning device for home receivers which is extremely simple, which can be manufactured at a very low cost, which is positive and exact in its operation, which permits the manual tuning by means of the usual rotating banks of condensers, but which does not employ any movable condensers that require exact adjustment, and which can be used for a long period of time without necessity for repair or replacement of any of its parts.

Another object of the invention is the provision of an improved timing device of the class described which may be easily adjusted to correct variations in the time setting of the clock, and which imposes no great strain upon the motor of the clock, and which is readily adaptable to be used with existing installations to be combined with and made a part of a radio receiver having the automatic timing and tuning mechanism built in the receiver.

Referring to the drawings, of which there are seven sheets,

Figure 1:
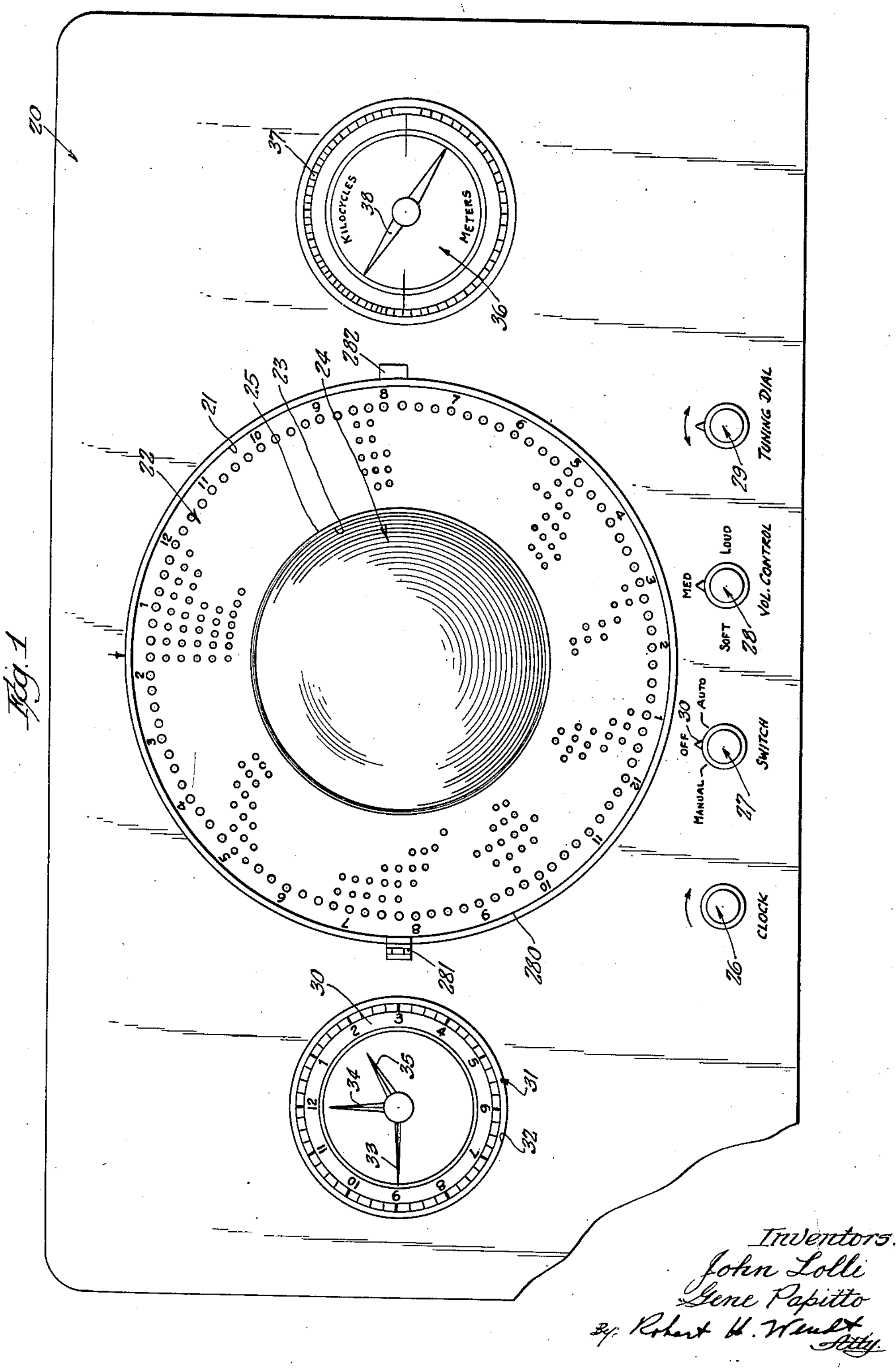
Fig. 1 is a front elevational view of a combined radio receiver and automatic station selecting and tuning mechanism embodying the invention.

Referring to Fig. 1, this is an elevational view, showing a radio receiver panel equipped with our automatic station selecting and tuning device. The panel or front wall of the cabinet is indicated by the numeral 20, and it is preferably provided with a round aperture 21 for exposing the selector mechanism, which is indicated in its entirely by the numeral 22.

As the structure of the selector mechanism includes a centrally located opening 23, the assembly may include the speaker 24, the diaphragm of which (not shown) is located behind any suitable screen, or grille, indicated at 24 as being circular in shape and having an outer circular border 25 in front of and slightly overlapping the inner border of the bore 23 of the selector mechanism 22.

The assembly preferably includes a number of manual actuating members, such as the knobs 26, 27, 28, and 29. The knobs 27—29 are preferably provided with similar pointers 30 for indicating any one of a plurality of positions. The panel or cabinet front 20 preferably includes a timing clock 31, the dial 30 of which is exposed through a circular bore 32. The clock 31 preferably includes a second hand 33, a minute hand 34, and an hour hand 35.

The purpose of the knob 26, which has the indicia "Clock" beneath it, is to adjust the minute hand 34 and hour hand 35 when the clock needs adjustment.

The panel or instrument front 20 preferably includes a tuning dial 36, with the usual indicia, kilocycles and/or meters, and the scale divisions 37 and one or more single or double pointers 38, for sweeping over the scales and indicating the position of the manual tuning mechanism which is to be actuated by means of the knob 29, which bears the words "Tuning dial" beneath it. The mechanism for accomplishing the clock adjustment and manual tuning will be described later.

The knob 27 is for the purpose of controlling a multiple bank switch, and bears the word "Switch" underneath it and position indicia indicating "Manual, Off, and Automatic." When this knob is turned to the position "Manual," the bank switch which it controls is in position to permit manual tuning, and the circuits of the selector are disconnected from the automatic tuning condensers.

When the switch 27 is in the "Off" position, the radio, which is controlled by the device, is completely de-energized; and when the switch 27 has its knob 27 in the "Automatic" position, the circuits are conditioned for automatic station selection and automatic tuning, as distinguished from manual tuning.

The volume control knob 28 is provided with indicia, "Soft," "Medium," and "Loud," and is the usual volume control member for a radio receiver.

Figure 2:
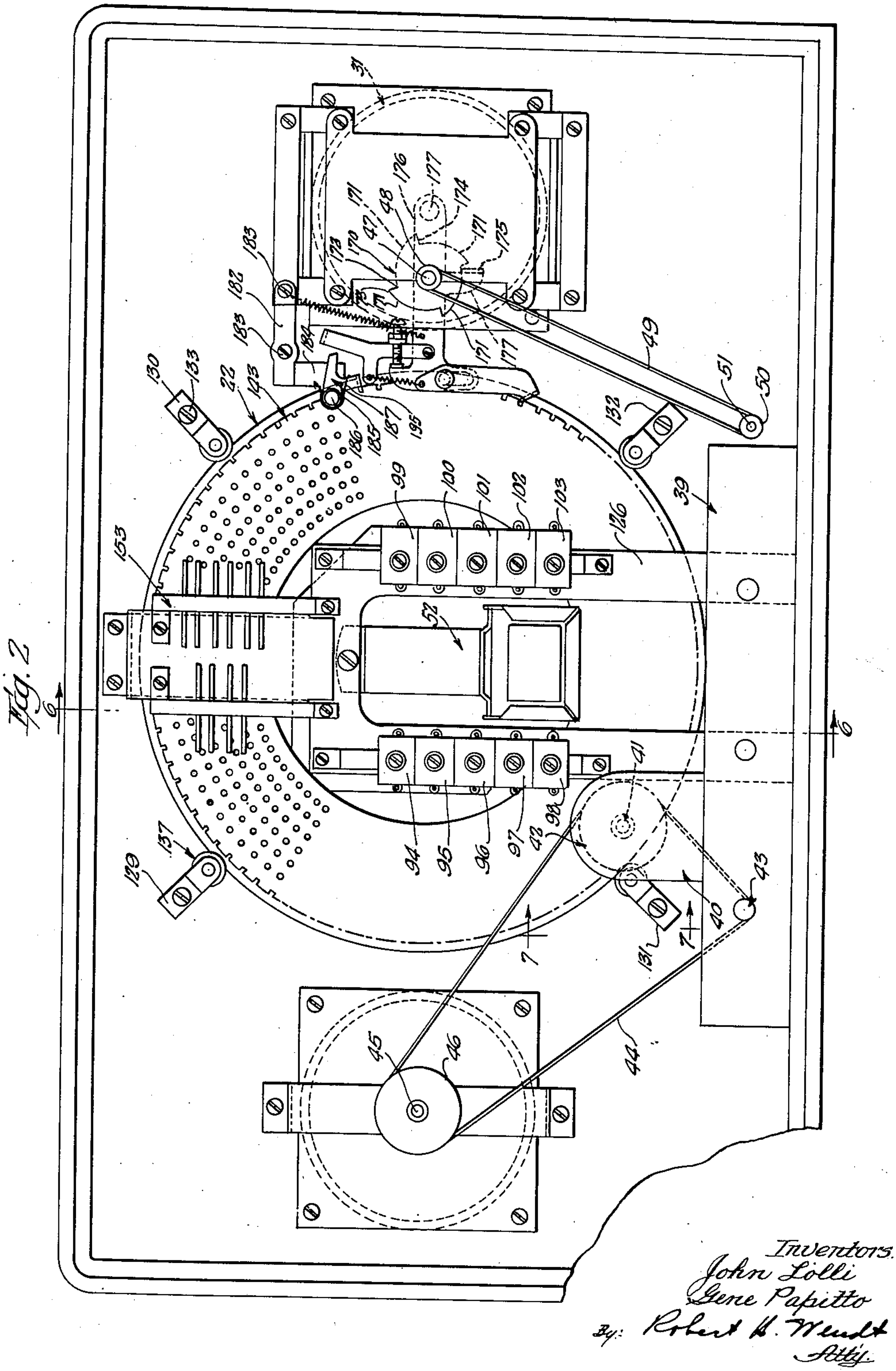
Fig. 2 is a rear elevational view of the mechanism, from which the details of the radio receiver have been omitted.

Referring now to Fig. 2, this is a rear elevational view, in which the usual amplifying and detecting circuits of the radio receiver are diagrammatically indicated by the rectangle 39, the bank of tuning condensers being indicated diagrammatically by the numeral 40.

The tuning condenser shaft is indicated at 41, and the driving pulley for the bank of condensers by the numeral 42. The tuning dial knob 29 on the front of the panel has a shaft extending backwardly through the panel, and is provided with a V pulley 43 of relatively small diameter, to be engaged by a belt 44. The tuning dial shaft 45, which carries the pointer 38, also corries the V pulley 46 behind the panel, and the belt 44 engages pulleys 42, 43, and 46. Thus, as the tuning dial knob 29 is rotated, the rotatable condenser banks 40 are moved by the belt 44, engaging pulley 42; and simultaneously the belt 44 moves the pulley 46 to move the pointer 38 and to indicate the station adjustment.

Referring to the right hand side of Fig. 2, the minute shaft 47 of the clock 31 projects from the rear side of the clock, where it is provided with a V pulley 48 for engagement with a belt 49.

The belt 49 also engages a V pulley 50 carried by the clock setting shaft 51 so that rotation of the knob 29 rotates pulley 50, moves belt 49, and rotates pulley 48 to adjust the minute hand 34.

The clock 31 is preferably of the synchronous alternating current type, but any type of clock may be employed which is adapted to tune the mechanism and to permit its proper adjustment, as described.

The mechanism of the speaker 24, which appears at the front of the panel 20, is indicated at the back by the numeral 52, and it is merely shown diagrammatically, as any type of suitable speaker may be employed.

Figure 5:
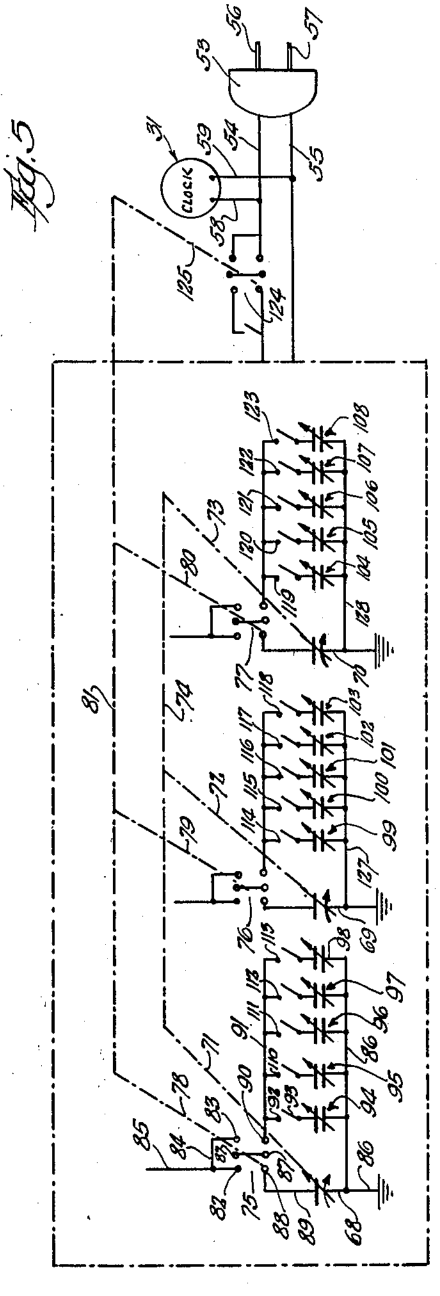
Fig. 5 is a wiring diagram of the electrical circuits employed in the automatic tuning mechanism shown in connection with the manual tuning circuit for a conventional receiver.

Referring now to the wiring diagram of Fig. 5, this diagram shows the circuits which are controlled by the knobs 27 and 28 and also by the selector mechanism.

In this diagram 53 indicates the wall plug, which is adapted to be connected with any standard wall socket that is energized with 60 cycle, 110 volt electricity.

The line conductors 54, 55, which lead from the connector prongs 56, 57, are connected by means of conductors 58, 59 to the circuit of the electric clock 31, which preferably operates continuously so that the selector is ready at any time to select the stations that have been previously designated by the user.

Assuming that the selector mechanism is to include five predetermined broadcasting stations and assuming that the radio receiver has an audio circuit and a radio frequency circuit, two condensers of predetermined capacity are required for tuning each station, in a receiver having two variable tuning condensers.

Figure 3:
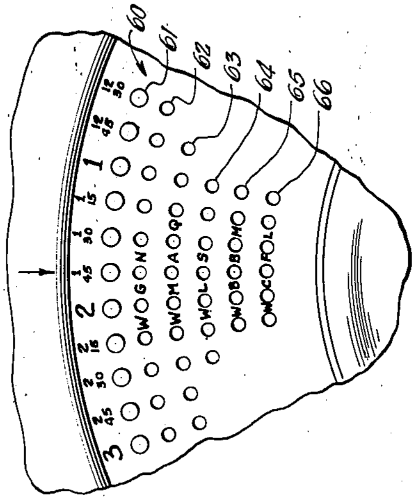
Fig. 3 is a fragmentary elevational view of the rotating station selector member, which also accomplishes the automatic tuning.

Referring to Fig. 3, the selector dial 60 is provided with a plurality of series of holes. The holes are arranged concentrically along circular lines 61, 62, 63, 64, 65, 66; and the holes are arranged radially along lines which correspond to the end of every quarter of an hour, or fifteen minutes, throughout a twenty-four hour day.

While only a few holes are shown in Fig. 3, it will be apparent that these run from 12:30 to 3:00 o'clock, which may be a. m. or p. m., and these are merely exemplary of the indicia that are used all around the selector dial 60.

The outermost row of holes 61 is for neutral purposes and for storing the pegs 67 (Fig. 6) when no station is selected for that quarter hour.

The circular series 62 of holes are, as indicated, for a certain station, which may be WGN. Thus, series 63 may be for another station, such as WMAQ, series 64 for WLS, series 65 for WBBM, and series 66 for WCFL, as indicated by these letters on the selector dial 60.

In the wiring diagram the three banks of movable condensers are indicated by the numerals 68, 69, and 70, and that these condenser banks are simultaneously adjustable is indicated by dotted lines 71—73, connected by the common actuating member, or dotted line 74.

The switch knob 27 controls three banks of switch contacts, indicated at 75, 76, 77, each being located to be engaged by a movable contact arm, which contact arms are generally indicated by the dotted lines 78, 79, and 80, joined by a common actuating member indicated by the dotted line 81.

The two outermost contacts 82, 83 are joined by means of a conductor 84 and have a common lead 85 interposed in the circuit of the radio receiver at the same point where the bank condenser 68 is interposed; and this may be accomplished by grounding the lower conductor 86 on the receiver frame, as is often done.

The two middle contacts 87 are merely neutral open position contacts. The contact 88 of bank 75 is connected by a conductor 89 to the movable condenser 68, while the other contact 90 of the bank 75 is connected to a common conductor 91 that leads to one of the contacts 92 of a multiplicity of switch members for controlling automatic tuning.

The other contact 93 of each of the multiplicity of selector tuning switches is connected to the terminal of a trimmer condenser 94, which has its other terminal connected to the common ground conductor 86.

Referring now to the bank 75, when the switch arm 78 is in the position connecting contacts 83 and 88 on the back side of panel 28, the knob is in the position with its pointer indicating "Manual" tuning, and the switch is conditioned for connecting the adjustable bank condenser 68 in the radio receiver circuit which includes conductors 85, 86, so that manual tuning may be accomplished.

When the switch arm 78 is in an intermediate vertical position engaging contacts 87, all circuits are broken, and neither manual nor automatic tuning can be accomplished.

When the switch is in position engaging the contacts 82 and 90 of banks 75 on the back of the dial, the knob 27 on the front has its pointer pointing to "Automatic" and tuning of this portion of the radio receiver circuit is to be accomplished by means of the trimmer condensers, five of which are shown connected to the conductors 91 and 86. The rest of the trimmer condensers are indicated at 95, 96, 97, 98.

In order to tune such a radio receiver by means of trimmer condensers, as many separate trimmer condensers are required for each station as there are variable condensers in the receivers. Thus, the banks 76 and the banks 77 of contacts control circuits similar to those controlled by the contact bank 75.

The other trimmer condensers are indicated by the numerals 99 to 103 and 104—108. These trimmer condensers are likewise connected to a common conductor 127, for the bank 76 and 128 for the bank 77.

It should be noted that even though the switch controlled by knob 27 is conditioned for automatic tuning by its positioning to contacts 82 and 90, the circuit will still be open at the individual selector switches 92, 93; and all of the others of the same type of Fig. 5, the contacts of which will now be numbered.

Thus, the fixed contacts of these individual selector switches of bank 75 are indicated by the numerals 110—113. The fixed contacts of the individual selector switches are indicated by the numerals 114—118.

The fixed contacts of the individual selector switches of the bank 77 are indicated by the numerals 119—123.

Since it is necessary to use three fixed condensers for tuning each station, and there are five stations, three times five, or fifteen, fixed condensers are employed, as follows:

The fixed condensers 94 and 99 and 104 may be those for tuning the station WGN. The fixed condensers 95, 100, and 105 may be those for controlling the tuning of the station WMAQ. The fixed condensers 96, 101, and 106 may be those for controlling the tuning of station WLS. The fixed condensers 97, 102, and 107 may be those for tuning the station WBBM. The fixed condensers 98, 103, and 108 may be those for controlling the tuning of the station WCFL.

While the trimmer condensers employed have been referred to as fixed condensers, this is a relative term, as even such trimmer condensers permit adjustment of capacity. They are preferably of the type employing a porcelain base and a pair of thin metal condenser plates mounted thereon and insulated by means of mica or the like, the proximity of these plates being controlled by means of a pressure screw adapted to be adjusted with a screw driver.

Thus the fixed condensers for tuning each individual part of the circuit for each part of the station may be adjusted so as to achieve perfect tuning, and thereafter need not be adjusted unless conditions change. In addition to the banks of contacts 75, 76, 77, the switch knob 27 preferably controls another bank of contacts 124, which has a movable arm 125 adapted to be actuated in common with the arms 78, 79, 80, as indicated by the dotted line 81.

This bank 124 has suitable contacts adapted to cut off entirely the energization to the radio receiver, while the switching is being accomplished by the banks 75, 76, 77 so that the energizing circuit may be re-established after each switching movement simultaneously with the establishment of the proper connections.

In other words, each common actuating member, such as 147 or 148 (Fig. 14) controls three sets of contacts for tuning the three stages of a three stage receiver; and at the same time it includes a fourth set of contacts for connecting the receiver to the energizing line at the contacts 124. When a peg 140 passes out from under one actuating member 147, for example (Fig. 6), the circuit will be opened in all three stages to disconnect the tuning condensers, and also at the energizing line 54, which leads to the wall socket; but the clock, being in advance of the bank of contacts 124, it will continue to operate. A moment later another peg in a suitable aperture in the selector will come into engagement with the camming surface on the side of another or the same lever 147 or 148 (Fig. 6), closing suitable contacts in all three stages, and also closing the main contacts 124, which keep the receiver energized.

In some embodiments of the invention permeability tuning may be substituted for trimmer condenser tuning. In such case each trimmer condenser has substituted for it a tuning coil which has an iron core, and which coil accomplishes the proper tuning of the circuit.

Such tuning has the advantage that it does not drift or lose its adjustment, which happens more frequently with trimmer condenser tuning.

It will thus be observed that the knob 27 controls suitable banks of switches, which have contacts adapted to connect in circuit in the radio receiver, either the banks of rotatable condensers or the conductors which lead to individual selector switches, for each station, by means of which fixed condensers can be connected in the radio receiver circuit in the same position as the movable condensers are usually connected. The number of switches depends on the number of variable condensers in the chassis.

Thus, when the knob 27 is turned to "Manual" tuning, the ordinary rotatable condensers of the radio receiver may be rotated to tune in the station. When the knob 27 is turned to "Automatic" tuning, the rotatable condensers are cut out of the circuit with the knob 27 in this position, it is the closure of the individual station selecting and tuning switches, which are indicated by the numbers 92—123, which energize the receiver and tune the station. Simultaneous energization and tuning is accomplished for any station when its three trimmer condensers are simultaneously connected in circuit by three of the switches of the series 92, 110—123.

We shall now describe the mechanism by means of which this is accomplished.

Referring to Fig. 2, the back of the panel is preferably provided with a suitable supporting framework, such as a U-shaped standard 126, the legs of which are shown supporting some of the trimmer condensers 94—108, some being on the opposite side of this frame.

The panel or front wall 20 supports on its rear side a plurality of roller brackets 129, 130, 131, 132, which are secured to the panel by the screw bolts 133 passing through the brackets.

Figure 7:
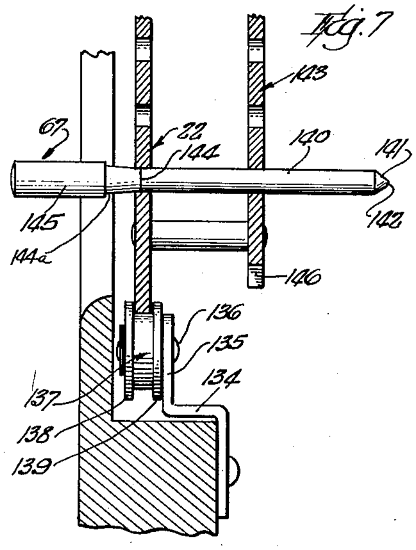
Fig. 7 is a fragmentary sectional view taken on the plane of the line 7—7 of Fig. 2, looking in the direction of the arrows.

Each of these brackets may have an angular offset 134 Fig. 7 and a pivot flange 135, which has a shaft 136 riveted in it and pivotally supporting a flanged roller 137. The roller 137 engages the edge of the circular selector dial 22, and the flanges 138, 139 engage in front and back of this selector dial.

The rollers carried by brackets 129—132 are preferably equally spaced about the periphery of the circular dial plate 22, and thus they support it for rotation about the axis of this dial plate. The selector and dial plate 22 may be constructed of a sheet of transparent plastic, such as Lucite or Tenite, or it may be a metal plate or a phenolic condensation compound, but the transparent plastic plate is preferred, as it is more easily worked, durable in construction, and adapted to retain the selector pins 67 by frictional engagement with the holes.

Referring to Fig. 7, the pins 67 are preferably made of metal, and may be provided with an elongated cylindrical or slightly tapered shank 140 terminating in a conical end portion 141, the point 142 of which is preferably rounded.

The length of the shank 140 is sufficient to extend completely through the selector dial plate 22 and another spaced plate 143, which may be utilized in the absence of sufficient thickness in the plate 22, both plates having aligned apertures.

The shank 140 may be provided with an annular tapered portion at 144 to 144*a* so that the pin may engage and be wedged into the front of the plate 22 by a slight twisting pressure.

The plate 22 may be made thick enough to provide adequate support for the pins 67 so that they will not give or bend from their proper axial position with respect to plate 22, but in some embodiments of the invention a secondary bracing plate 143 may be employed which is slightly smaller in size and provided with the same registering apertures for pins 67.

Bracing plate 143 may also be utilized as a driving member and may have its periphery provided with a multiplicity of regularly spaced slots 146, these slots being radially arranged and rectangular in elevation and being located accurately at angular distances corresponding to one-ninety-sixth of the circumference.

The slots or notches 146 provide definite shoulders for engagement with a step-by-step and a stop mechanism by means of which the selector plate 22 is rotated step by step at the end of each quarter hour and definitely held in predetermined position throughout each quarter of an hour.

Figure 6:
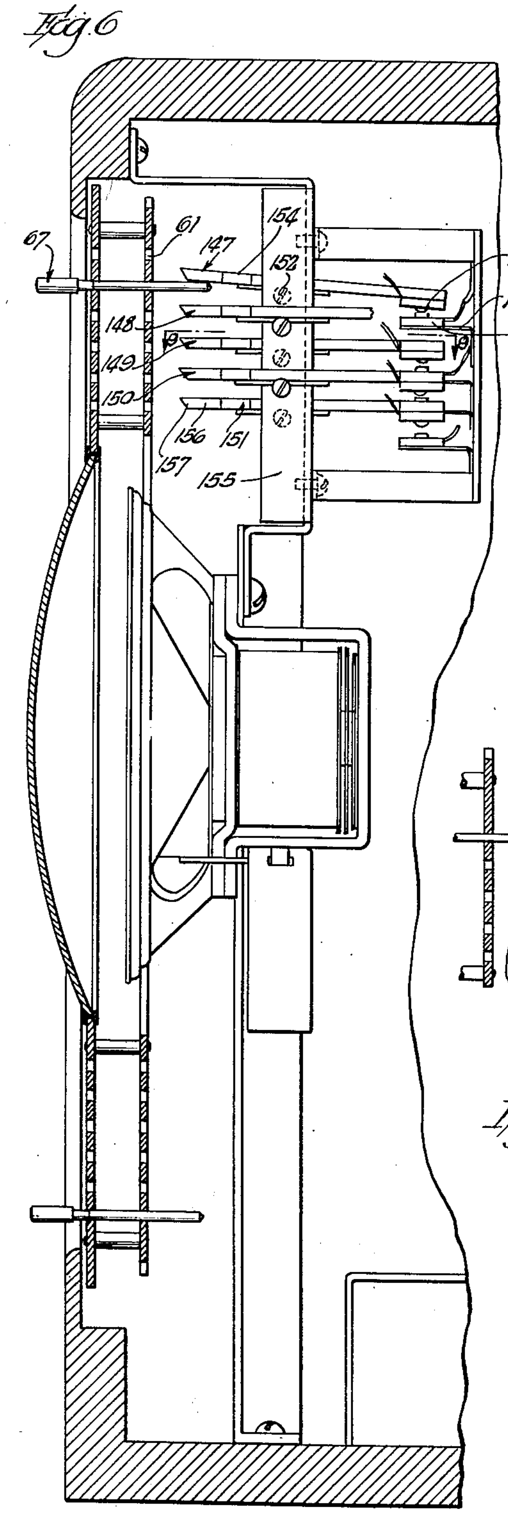
Fig. 6 is a vertical sectional view taken on the plane of the line 6—6 of Fig. 2, looking in the direction of the arrows, showing the way in which the station selector and tuner actuates the proper switches, and showing the details of construction and mode of support of this element.

The pins 67 project through the back of the two plates 22 and 143 sufficiently to engage any one of a multiplicity of switch levers, indicated by the numerals 147—151 (Fig. 6). These switch actuating levers are pivotally mounted on the pivot bolts 152 on an upwardly extending auxiliary frame 155, in such a manner as to pivot on a horizontal axis and in such manner that the left ends of the levers 147—151 (Fig. 6) are in position to be engaged by the pin 67, the particular switch lever to be actuated depending upon the location of the pin 67 in the series of holes 62—66 (Fig. 3).

If the pin 67 is located in any of the series 62, it will be in position to engage the switch lever 147; and in this manner the pin 67 may be located to actuate any one of the switch levers 147—151 for any quarter of an hour.

The switch levers 147—151 are preferably provided with offsets 154 so that the levers may be staggered and located on opposite sides of the frame member 155, while still having their end portions in the same vertical plane.

Each switch lever has its left end provided with a side bevel 156 and with an end bevel 157. The side bevel 156 is on the side toward which the pins 67 rotate so that it may act as a camming surface engaged by the pin shank 140 to cam a lever 147—151 upward in Fig. 6 to close the switch contacts.

Thus, as the selector dial rotates a pin 67, which happens to be at the top, engages a switch lever for that particular quarter hour for each step in the rotation of the selector dial, and closes the proper circuits, indicated in Fig. 5, to tune the station which corresponds to the radial location of the pin 67.

Each switch lever 147—151 controls four pairs of contacts, thus establishing a closed circuit for three trimmer condensers, which will tune the circuits of that particular station, and another pair of contacts for energizing the circuit. For example, the switch lever 147 might close the circuit of trimmer condensers 94, 99, and 104 to effect a tuning of station WGN by closing contacts at 92, 114, and 119. The contacts 124 are the contacts for energizing the circuit.

Referring to Fig. 6, each switch lever 147—151 carries a transverse insulating bar 158, which carries three contacts for engaging three contacts carried by the insulating bar 159 mounted on resilient springs 160.

Figures 8, 9:
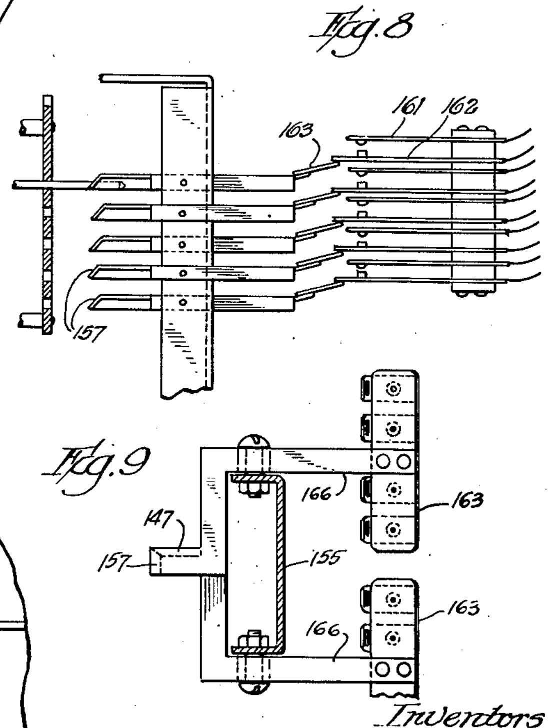
Fig. 8 is a fragmentary elevational view taken on the same plane as Fig. 6, showing a modified form of switch mechanism.
Fig. 9 is a fragmentary plan view of the mechanism shown in Fig. 6.

Referring to Fig. 8, this is a similar view of a modification, in which the contacts of the resilient relay type are employed, each switch including a spring 161 and another spring 162 carrying contacts which are actuated by means of a cross bar 163 that closes three switches simultaneously.

Switch levers 147—151 are provided with their end bevel 157 so that the pins 67 may be used to tune in the station by the push button method at any time, even when the pin 67 is inserted in the holes, which are then opposite to the levers 147—156.

When this is done, the pointed end 141 of the pin 67 engages the beveled end 157 of one of the levers and moves the lever to closed switch position without utilizing the side camming surface 156.

Thus the present apparatus may be used for instantaneous push button tuning at any time. The station selected may be changed in the midst of a quarter hour period at the will of the operator. As only one pin is provided for each radial series of holes, only one station should be tuned in at once.

Figure 14:
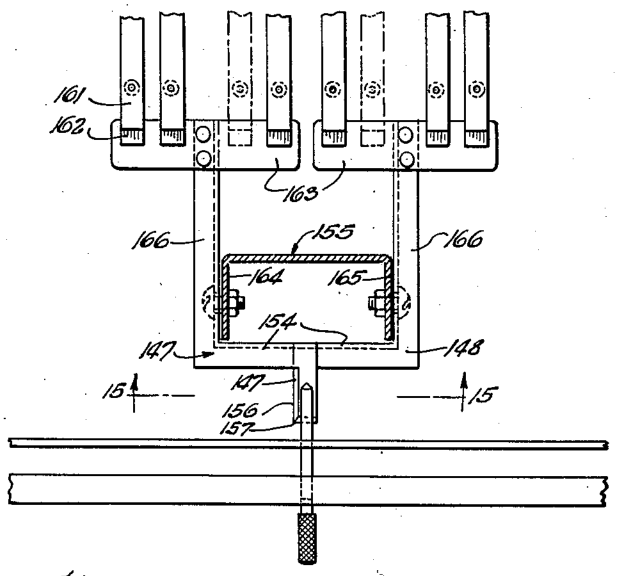
Fig. 14 is a fragmentary top plan view, showing the details of structure of the switch actuating members and their mode of engagement with the controlling pins.
Figure 15:
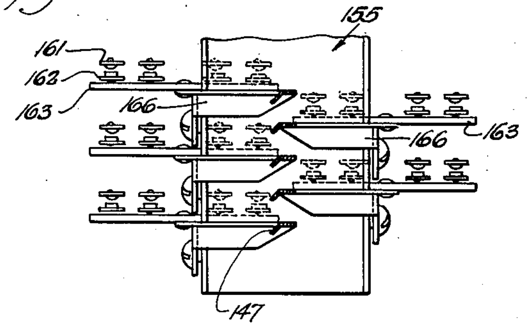
Fig. 15 is a fragmentary elevational view taken on the plane of the line 15—75 of Fig. 14, looking in the direction of the arrows.

Referring to Fig. 14, this fragmentary plan view shows the two uppermost switch actuating members 147 and 148. The supporting column 155 is there seen to be a substantially U-shaped channel member, one flange 164 of which pivotally supports the lever 147, and the other flange 165 of which pivotally supports the lever 148.

The offsets 154 in each of these levers bring the beveled end portion 147 of each lever into the same radial plane with respect to the pins 67.

By means of the offset portions 154 and by the disposal of the end portions 166 of the levers 147—151 in the manner shown in Fig. 14 more room is provided for the banks of switches. The number of switches actuated by a cross bar 163 is unlimited; and if there are more than two receiver stages, they may be controlled also by the same switch.

Thus, if there are three receiver stages, in Fig. 14, there are for the lever 147 four pairs of contacts, one for receiver stage No. 1, one for receiver stage No. 2, and another for receiver stage No. 3, and one pair of contacts for the current supply.

Figure 16:
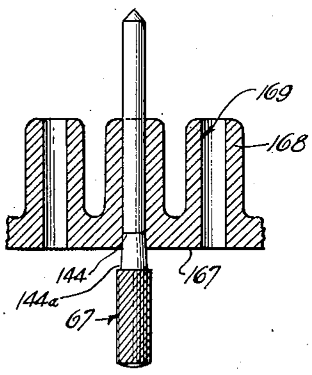
Fig. 16 is a fragmentary sectional view of a modification of the selector plate by means of which the double plate of Fig. 14 may be eliminated and the pins given adequate support in a single plate.

Referring to Fig. 16, this shows a modified form of station selector dial 167, which may be molded with rearwardly extending cylindrical lugs 168 of such length that they provide the pins 67 with an elongated support in the bores 169, which is practically equivalent to the two spaced points of support that are provided by the plates 22 and 143.

In other embodiments of the invention the plate 167 may be made as thick as the distance from the front of the plate to the end of the lugs 168.

Figure 4:
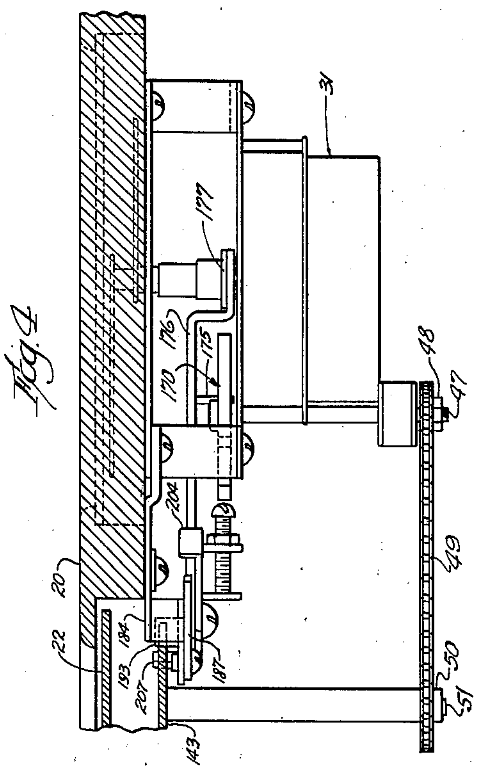
Fig. 4 is a fragmentary top plan view of the step-by-step mechanism for moving the station selector from one position to the other at the end of each fifteen minute broadcast period.
Figures 10, 11:
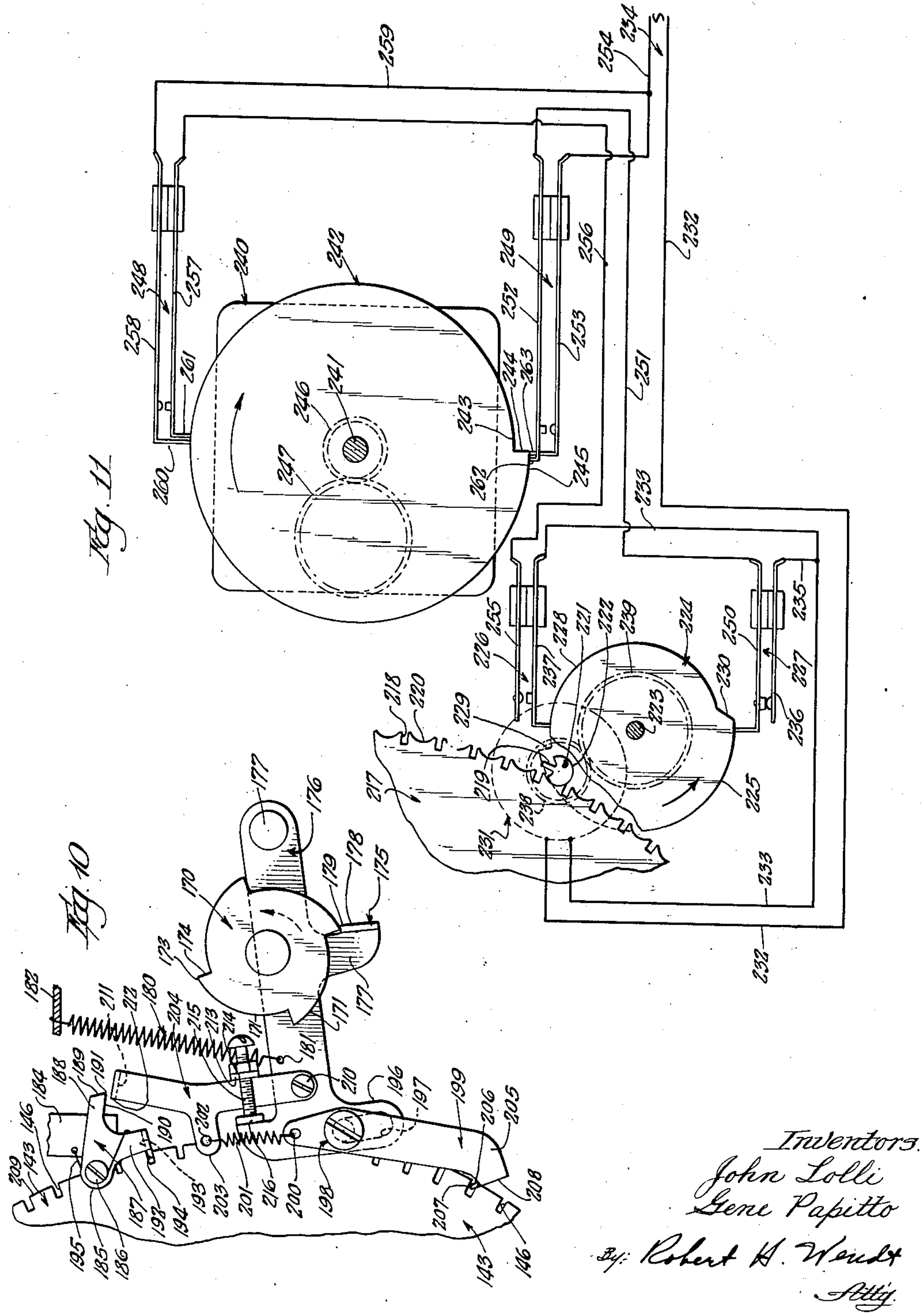
Fig. 10 is a fragmentary elevational view showing the position in which the step-by-step mechanism is at a time just prior to its actuation of the station selector member.
Fig. 11 is a diagrammatic elevational view showing the mechanism and circuit for another form of step-by-step mechanism adapted to hold the station selector in its proper position and to move it at an accurately predetermined time into its next position by means of a suitable motor and controlling switches.

Referring to Figs. 2, 4, and 10, these views show the step-by-step mechanism by means of which the station selecting and tuning plate 60 is rotated by an angular distance equal to one ninety-sixth of the one revolution at the end of each fifteen minute period and positively held in this position until the end of another fifteen minute period.

It is of the utmost importance that this mechanism be accurate within a few seconds; otherwise an important part of the program at the beginning or end may be missed by the listener.

The clock 31 has its minute hand shaft 47 extending backwardly of the clock housing, or it may have an auxiliary shaft, such as the shaft 47, which moves at the same rate as the minute hand, that is, the shaft 47 makes one complete rotation per hour, and it makes one-quarter of a rotation every fifteen minutes with the minute hand to the shaft of which it may be geared.

The shaft 47 may carry the pulley 48, which is used to adjust the clock and correct its timing; and in addition to the pulley shaft 48, the shaft 47 may carry a cam 170. The cam 170 includes four camming surfaces 171, each of which increases in radius from a minimum at the point 172 to the point 173.

The point 173 corresponds angularly to the end of a fifteen minute period, and the radial shoulders 174 must permit an immediate drop of a follower engaging this cam, when the follower passes the point 173, in order to effect a quick timing.

The cam 170 is engaged by a follower 175, which may consist of an axially extending flange or bar carried by a lever 176. The lever 176 is pivoted upon a stub shaft or bolt 177, which may be one of the shafts of the clock, and the lever extends laterally from the clock into proximity with the plate 143, having the rectangular notches 146.

The follower flange 175 may be carried by a downwardly extending flange 177 on the lever 176, and the follower has its surface 178 preferably disposed at an angle which gives a clearance between the surface 178 and the points 173 on the cam so that when the corner 179 of the follower passes the point 173, the follower 175 is fully clear of the radial shoulder 174 at this point of the cam.

Thus, there is an abrupt movement of the lever 176 when the cam rotates to a position so that point 173 passes corner 179. Lever 176 is urged in a clockwise direction in Fig. 10 by a tension spring 180, having one end hooked in the lever at 181 and the other end hooked in a frame member 182 carried by the back of the panel. The lever 176 is thus constantly urged into engagement with the cam 170, which rotates counterclockwise.

The frame member 182 may be supported in spaced relation to the panel by a plurality of bolts 183, and may have a depending arm 184 located adjacent the plate 143. The arm 184 has an extension 185 overlapping the plate 143, but not extending far enough to interfere with pins projecting through the holes in the plate and extension 185 has a stub shaft 186 for rotatably supporting a pawl 187.

Referring now to Fig. 10, where these parts are shown on a larger scale, the pawl 187 is in the form of a bellcrank, having an actuating arm 188 beveled at 189 and provided with a radial surface 190 to provide a sharp corner 191.

The pawl 187 has another arm 192, which is preferably disposed in overlapping relation to the plate 143, and the arm 192 carries an axially extending flange 193, preferably having a beveled edge 194 adapted to be received in the slots 146.

The point of pivot 186 of arm 187 is on a line at right angles to the radius of the slot 146 so that flange 193 moves into slot 146 with a minimum amount of clearance to hold the plate 143 in accurately predetermined position.

The pawl 187 may be engaged by a spring 195, which has a plurality of helical turns about the stub shaft or bolt 186, and has one end hooked in the supporting arm 184 and the other end hooked about the bellcrank arm 192, urging the pawl 187 into engagement with the plate 143.

The edge 194 of the stop flange 193 may project from the arm 192 toward the plate 143. The pivot bolt 186 may consist of a cylindrical headed member threaded into the flange 185. Thus the pawl 187 is adapted to hold the plate 143 when it is located in a slot 146.

The lever 176 may also carry a depending arm 196 provided with a peripherally extending slot 197. A shoulder bolt 198 extends through the slot 197 with its cylindrical portion, and has its shoulder engage a pawl 199 located behind the lever 176 in Fig. 10.

Thus the pawl 199 is mounted for pivotal and sliding movement on the lever 176, and the length of the slot 197 is equal to the travel of the arm 176 at this point when it is moved or permitted to move by the cam 170.

The pawl 199 has its upper end provided with a hole 200, in which a spring 201 is hooked. The other end of the tension spring 201 is hooked in the hole 202 of an arm 203 carried by a pawl actuating lever 204, further to be described.

The direction in which the spring 201 pulls the pawl 199 is such that it tends to pivot the lower end 205 of pawl 199 into engagement with the plate 143, and it tends to pull pawl 199, with its shoulder bolt 198, upwardly in the slot 197.

The lower end 205 of pawl 199 has a diagonally and upwardly extending transverse flange 206, which has a beveled end 207 for engaging in the slots 146 on the plate 143, toward which the engaging surface 207 of pawl 199 is urged.

The purpose of the pawl 199 is to advance the station selector step by step. As the cam 170 rotates its camming surfaces 171 engage the follower 179 and urge the lever 176 in a counterclockwise direction. As this is done, the pawl 199 moves downwardly from the slot 146, in which it happens to be engaged, and is cammed out of this slot by the camming surface 208.

Thereafter the pawl 199 rides on the outer cylindrical surface 209 of the plate 143 until the beveled surface 207 drops into the next slot. Thus the rotation of the cam 170 has caused the lever 176 to be depressed until the pawl 199 has taken a new hold on the rotating plate 143; and when the follower 175 passes point 173 on cam 170, spring 180 pulls the lever 176 in a clockwise direction, tending to cause the pawl 199 to rotate the plate 143.

It will be recalled that this plate is held in a fixed position by the pawl 187; and therefore provision is made, by means of the pawl actuating lever 204, to release the pawl 187 when the lever 176 has traveled a predetermined amount.

The lever 204 is pivoted on the lever 176 by means of another shoulder bolt 210, having its cylindrical portion pivotally supporting the lever 204, and having its threaded portion threaded into the lever 176.

The pawl actuating lever 204 extends upwardly along the periphery of the plate 143 and has the lateral extension 203 for engagement with the spring 201, which urges this pawl in a counterclockwise direction. At its upper end the lever 204 has a laterally extending flange 211 located to engage the edge surface 190 on the pawl arm 188, and the edge 212 of the flange 211 is so located that it can pass the corner 191 on the pawl 187.

The lever 204 preferably has another laterally extending flange 213 closer to the pivot 210 and provided with a threaded bore 214 for receiving a screw bolt 215. The screw bolt 215 may be secured in place by a lock nut, and has its end engaging the opposing surface of a stop flange 216 carried by an upward extension of the lever 176.

Thus the pivotal position of the pawl actuating lever 204 on the lever 176 is determined by the adjustment of the screw bolt 215 engaging flange 216, and the spring 201 urges the lever into this position. The screw bolt 215 may thus be used to adjust the flange, at which the edge 212 of the flange 211 will slide off the corner 191 of the pawl 187.

The operation of this part of the mechanism is as follows: When the lever 176 rides over a point 173 of the cam 170 and moves in a clockwise direction, and the pawl 199 pulls upward on the plate 143, tending to rotate it, the lever 204 also moves upward until the flange 211 engages the surface 190 and pivots the pawl 187 counterclockwise to remove its keeper 193 out of a slot 146.

The plate 143 is already under tension of the spring 180, tending to move the lever 176 upward, and with it pawl 199 and plate 143. The release of the plate 143 by pawl 187 thus causes the plate to move upward; but, as the lever 176 and pawl actuating lever 204 move upward, the flange 211 rides off the point 191 and permits the pawl 187 to have its edge 194 ride on a cylindrical surface 209 of the plate 143.

Thus the pawl 187 is in position to snap into the next slot 146 to hold the plate 143 in this position for one quarter of an hour.

It will thus be observed that the clock mechanism is adapted to move the plate 143, and with it the station selector and tuning dial 22 step by step at the end of each quarter of an hour, and also to hold it in this position without possibility of change except at the proper time. The strength of the spring 180 is such that it is strong enough to cause the dial plate 22 to rotate and to cause the pins 67 to engage the beveled surfaces 156 upon the switch levers to actuate the switch levers into closed position, as shown by Figs. 6 and 8.

The step by step mechanism provides a delayed instantaneous action for moving the plate 143.

The switch levers are held in closed position by the pins until the pin passes the lever which it is engaging, after which the spring tension of the switch levers urges them to the open position.

This spring tension is provided by the spring contacts 162 (Fig. 8); but in the embodiment of Fig. 6 springs are provided for urging the levers 147—151 in a counterclockwise direction.

Referring to Fig. 11, this is a modification in which the rotating selector dial is controlled by a simpler type of electrically controlled mechanism. In this case the edge of the rotating plate 217, which is otherwise similar to the plate 143, is provided with radial slots 218 for receiving a holding member 219 of similar shape carried by an escapement mechanism.

Between the slots 218 there is a concave cylindrical edge portion 220, and the escapement member 221 has the major portion of its surface cylindrical at 222 for slidably engaging the concave surface 220. In this case the shaft supporting the escapement member 221 rotates once each quarter of an hour, and is suitably geared to the shaft 223 to accomplish this. The shaft 223 is driven by the motor 231, to which it is suitably geared so that the escapement member 221 rotates once each quarter hour.

The shaft 223 also carries a cam 224, having a dwell 225 of larger radius and adapted to hold the switches 226 and 227 closed when they engage this dwell. The cam 224 also has a dwell 228 of relatively smaller radius, which permits the switches 226 and 227 to remain open while they engage this portion of the cam.

The cam 224 has an abrupt shoulder at 229, off which the switches 226, 227 pass as the cam rotates counterclockwise, and it has a sloping camming surface 230 by means of which the switches 226, 227 ride from the smaller radius dwell 224 to the large radius dwell 225.

The escapement member 221 is driven by a motor 231, the energization conductors of which are 232 and 233. Conductor 232 extends to the line at 234, which is preferably energized with 60 cycle alternating 110 volt current, while the conductor 233 is connected by conductor 235 to the fixed contact 236 of switch 227.

Conductor 233 is connected to the movable contact 237 of switch 226. The cam 224 is driven by the motor 231 through the intermediary of gears 238 and 239.

This timing device also includes a clock 240, which has a shaft 241 driving a cam 242. The cam 242 gradually increases in radius from the point 243, where there is an abrupt shoulder 244, the maximum radius being outwardly of this shoulder at 245.

The cam 242 and shaft 241 may be driven from the minute hand shaft by means of gears 246, 247; and the cam 242 controls a pair of switches 248, 249. The movable contact 250 of switch 227 is connected by conductor 251 to the movable contact 252 of switch 249.

The switch 249 has another movable contact 253, which is connected to the line conductor 254. The fixed contact 255 of switch 226 is connected by conductor 256 to the movable contact 257 of switch 248. The other movable contact 258 of switch 248 is connected by conductor 259 to the line 254.

The movable contacts of the switches 248 and 249 have laterally turned end portions 260, 261, 262, and 263 engaging the edge of cam 242. These laterally turned end portions or contact followers for the cam are spaced from each other peripherally of the cam so that one after another rides off the abrupt shoulder at 244.

When both of the contacts of a switch 249 or 248 are riding on the cam at the same radius, the switches are open, whether it be a large or small radius. The switches 248 and 252 are only closed momentarily as the cam rotates clockwise, when the flange 263 rides off the shoulder 244 first to close the switch 249, or the flange 260 rides off the shoulder 244 before the flange 261 of switch 248.

Thus the cam 242 is adapted to close the circuits at the switches 248 and 249 only momentarily, after which the circuits are again opened; and there being two switches, this momentary closing occurs at each switch once each revolution of the cam 242.

The operation of the mechanism of Fig. 11 is as follows: The clock escapement or Geneva movement member 221 is rotated once at the end of each quarter of an hour, this action taking place quite quickly, and the lug 219 engaging in one of the grooves 218 to move the plate 217 one step forward.

The member 221 is driven by the motor 231, and through the intermediary of suitable gearing the motor 231 drives the cam 228. The cam 228 makes one-half turn every fifteen minutes, and the switches 226 and 227 are used to deenergize the motor 231. Each of these switches, however, is in series with the line and with one of the switches 248 and 249. For example, the switch 227 is in series with the switch 249 controlled by the cam 242. The switch 226 is in series with the switch 248 controlled by the cam 242.

The cam 242 makes one-half turn every fifteen minutes so that one or the other of the switches 248, 249 is energized momentarily, and then de-energized, at the end of each quarter hour period.

Suppose, for example, that the position of the abrupt shoulder 244 of cam 242 is approximately as shown at the end of a quater-hour period. Then the member 252 of switch 249 will pass off the abrupt shoulder 244 and come in contact with member 253 of switch 249, thus causing a circuit to close.

Now, since switch 227 is in series with switch 249, it will complete the circuit to the motor 231, because the member 250 of switch 227 is on the dwell surface of cam 225, which causes switch 227 to close its part of the circuit.

This circuit to the motor being complete, the motor 231 will be energized, which then will cause member 221 to rotate once to advance plate 217 one step forward. This action of the motor, however, causes the motor to de-energize itself, because as it drives member 221 one complete revolution, it simultaneously drives cam 228 one-half revolution until abrupt shoulder 229 comes opposite member 250 of switch 227, which will open and break circuit as member 250 passes off shoulder 229.

As cam 228 causes switch 227 to open, it at the same time causes switch 226 to close, preparing a circuit which will be completed by switch 248 at the end of another quarter-hour period. Thus the plate 217 is rotated one step each quarter of an hour and is held in fixed position throughout the fifteen minutes, while the selected program is being received.

Figure 17:
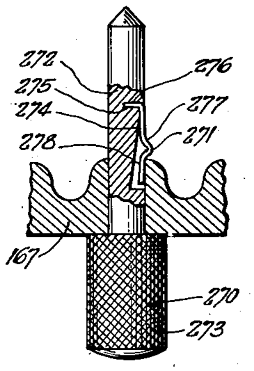
Fig. 17 is a fragmentary sectional view taken through a modified selector plate, which is provided with improved pins adapted to be retained in the plate by means of a positiive latch.

Referring to Fig. 17, this shows the improved selector plate 167 provided with an improved form of pin 270, with positive means 271 for holding the pin in the plate. In this case the shank 272 of the pin is of the same shape previously described, and the head 273 may be similar in shape.

The shank 272 is provided with an axial slot 274 communicating with a radial bore 275. The latching means for holding the pin comprises a light spring wire 271, which has an inwardly turned end 276 with a friction fit in the bore 275.

From the bore 275 the wire has an upwardly extending hump 277 that engages the back of the plate 167 to hold the pin in place. Below the hump the slot 274 is sufficiently deep so as to give the wire room in which to bend out of the way to permit the pin to be inserted or removed from the plate 167.

The hump in the drawings is purposely exaggerated to illustrate its action. When the pin is pressed into its bore, the wire 271 is flattened out, but it springs out behind the plate to hold the pin in place. The hump 277 is cam shaped or sloped at each side so that it is automatically flattened out while the shank of the pin passes through the bore of the plate.

In this case it is unnecessary to provide the front of the panel with a means for preventing removal of the pins. When the latching pins are not used, the front of the panel is preferably provided with an extra plate 280 hingedly mounted at 281 and latched shut at 282 on the opposite side, this plate being annular in shape and wide enough to cover all of the pins to prevent their unauthorized removal.

The plate 280 also has an aperture in the middle for the speaker 24, or in some embodiments of the invention the clock may be placed in the center.

Figures 12, 13:
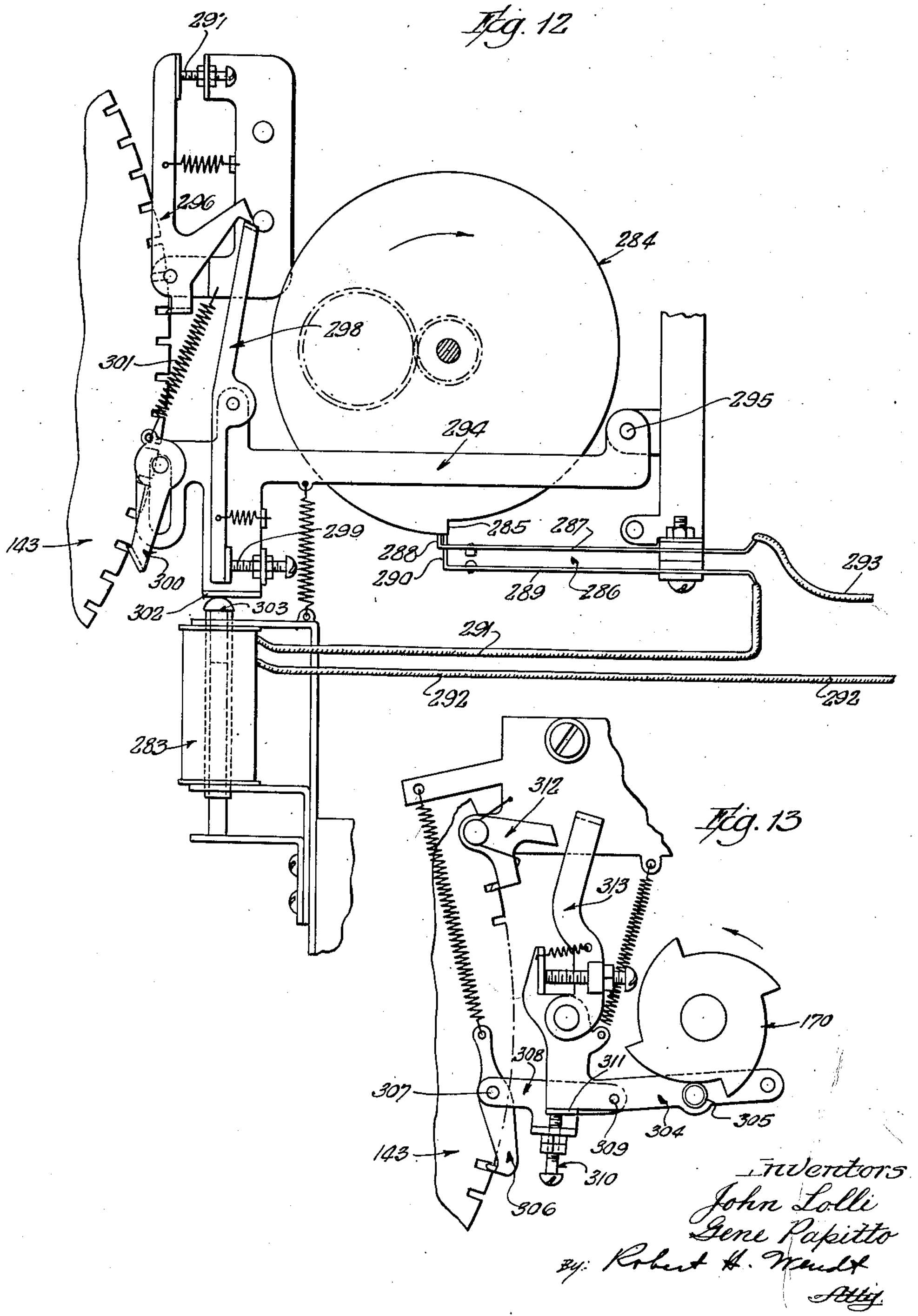
Fig. 12 is another fragmentary elevational view of a modified form of step-by-step mechanism in which a solenoid is utilized for moving the station selector member, the parts being in the position which they assume just before the station selector member is moved another step.
Fig. 13 is a view similar to Fig. 10, showing the step-by-step mechanism of this embodiment in another position.

Referring now to Fig. 12, this in another modification, in which the plate 143 is provided with a step-by-step actuating mechanism similar to that described in Fig. 2; but in this case the load is taken from the clock and placed upon a solenoid 283.

In this case the clock shaft, which makes one revolution every fifteen minutes, may drive a cam 284, which has an abrupt shoulder 285 and an increasing radius from the abrupt shoulder 285 around the cam to the outer part of this shoulder.

The cam 284 is adapted to actuate a pair of spring switch arms of the switch 286. The switch arm 287 has a short engaging end portion 288 riding on the cam 284. The switch arm 289 has a longer flange 290 riding on the cam 284.

The contacts carried by switch arms 287, 289 are connected by conductors 291, 292 to the coils of the solenoid 283 and to the line at 292, 293 of current suitable for energizing the solenoid. The lever 294, which is pivoted on the frame at 295, is similar in operation to the lever 176 previously described in Fig. 10.

The retaining pawl 296 is similar to retaining pawl 187 previously described, but is different in shape, and engages an adjustable stop screw 297 carried by the frame. The pawl actuating lever 298 operates like the pawl actuating lever 204 of Fig. 10, but has its lower end engaging an adjustable stop screw 299 carried by lever 294.

The pawl 300 is similar in operation to the pawl 199 previously described, and is urged upward by spring 301. The lever 294 has a laterally turned flange 302 above the solenoid plunger 303, which engages this flange and moves the lever 294 upward whenever the solenoid is energized.

Aside from being actuated by a solenoid, the operation of this mechanism is the same as that of Fig. 10. The cam 284 only closes the switch 286 momentarily, when the flange 290 rides off the shoulder 285 at the end of each quarter hour. A few seconds later the flange 288 rides off the shoulder 285, and the switch 286 is again opened up. During this time the solenoid has been energized momentarily and has moved the plate 143 one step forward to select and tune the mechanism of the receiving set for the next station.

Referring to Fig. 13, this in another mechanism similar to that of Fig. 10, but having further refinement in the adjustment of the lower pawl. In this case the lever 304 is similar to the lever 176 of Fig. 10, but carries a roller follower 305 for engaging the cam 170.

The pawl 306 operates similar to the pawl 199 of Fig. 10, but instead of having a pivot post and slot connection, it is pivotally mounted at 307 on a lever 308, which is pivotally mounted at 309 on the lever 304. The pivotal motion of the lever 308 on the lever 304 performs the same function as the slot 197 in Fig. 10, but the amount of this pivotal movement is adjustable by means of a set screw 310, carried by lever 308, engaging flange 311 on lever 304.

The pawl 312 in this mechanism operates like pawl 187 of Fig. 10. The pawl actuating lever 313 operates like the lever 204 of Fig. 10, but is provided with a separate spring, urging it toward the pawl 312. Likewise the pawl 306 has a separate spring urging it into the notch-engaging position.

It will thus be observed that we have invented an improved radio station selector and tuner by means of which the user of a radio receiving set may select the same one or different stations for any quarter of an hour of the day, and having selected any one of these predetermined stations, the mechanism will automatically turn off the station from which broadcast is being received, and select a new station, or continue the same station at each quarter of an hour, as predetermined by the user.

The present mechanism is very simple, and can be manufactured at a very low cost. Its operation is positive, and it not only moves the station selector to the next place positively, but it also holds it positively in that place.

The selection of a new station and tuning of the new station is accomplished almost momentarily within a few seconds and accurately at the end of the quarter hour. The correction of the time of the clock may be accomplished at any time by the user.

The selector may be changed to any of the other stations at any time by the user, even while the program is being received. The present push pull controlling pins may be inserted as desired, either while the station is on or before or after the station is tuned.

The present apparatus may be used for receiving sets having any number of different stages. Suitable arrangements are also made for permitting a separate manual tuning by means of an adjustable condenser plate.

While we have illustrated a preferred embodiment of our invention, many modifications may be made without departing from the spirit of the invention, and we do not wish to be limited to the precise details of construction set forth, but desire to avail ourselves of all changes within the scope of the appended claims.

Having thus described our invention, what we claim as new and desire to secure by Letters Patent of the United States, is:

1. A station selector and tuner for a radio receiver, comprising a support, a multi-stage radio receiver carried by said support, a fixed trimmer condenser for each radio station and for each stage of the receiver, each condenser being connected in circuit with one of the receiver stages and with a station switch, a common actuating member for actuating all of the switches controlling the trimmer condenser for the various stages for each station, said actuating member being laterally beveled to provide a camming surface, said receiver including a speaker carried by said support, and said speaker registering with an opening in an annular station selector member, grooved rollers carried by said support, said annular selector member having its edges mounted in the grooves of said rollers, said selector member having a ring of holes through it for each station and a hole in each ring for each quarter hour of the day, a plurality of headed pegs mounted in said holes and projecting backwardly from said annular selector member in position to engage predetermined common switch actuating members at their lateral camming surfaces as the annular selector member rotates, each peg actuating a predetermined common actuating member at the beginning of a predetermined quarter hour period, means for rotating the annular selector member step by step at the end of each quarter hour through an arc equivalent to one quarter hour on the annular selector member, and means for positively holding the annular selector member from moving in either direction during the periods of time between its step by step movements.

2. A station selector and tuner according to claim 1, in which the common actuating members for the trimmer condenser switches are provided with beveled ends and the pegs may engage these beveled ends when inserted through a hole which is already in registry with the common actuating member in question, to cam the common actuating member into closed switch position by engagement of the end of the peg with the camming surface on the end of the common actuating member.

3. A station selector and tuner for radio receivers according to claim 1, in which the pegs are recessed to provide space for a retaining spring provided with a hump for engaging a retaining shoulder on the back of the annular selector member.

4. A station selector and tuner for radio receivers according to claim 1, in which the step by step mechanism is controlled by a switch driven by a clock, and in which the means for positively holding the station selector against rotation in either direction as aforesaid, comprises a circular formation on a Geneva gear adapted to rotate in a complementary, concave, circular formation in the edge of the annular station selector.

JOHN LOLLI.
GENE PAPITTO.

REFERENCES CITED

The following references are of record in the file of this patent:

UNITED STATES PATENTS

| Number | Name | Date |
| --- | --- | --- |
| 1,356,915 | Fisher | Oct. 26, 1920 |
| 1,937,099 | Stewart | Nov. 28, 1933 |
| 2,073,417 | Fox et al. | Mar. 9, 1937 |
| 2,097,330 | Kiena | Oct. 26, 1937 |
| 2,234,668 | Davenport | Mar. 11, 1941 |
| 2,257,537 | Samburg | Sept. 30, 1941 |
| 2,337,568 | Owens | Dec. 28, 1943 |
| 2,346,623 | Stewart et al. | Apr. 11, 1944 |